GUSTAV A. HAGEMANN, OF NATRONA, PENNSYLVANIA.

Letters Patent No. 87,042, dated February 16, 1869.

IMPROVED PROCESS FOR MANUFACTURING SODA AND ALUMINA.

The Schedule referred to in these Letters Patent and making part of the same.

*To all whom it may concern:*

Be it known that I, GUSTAV A. HAGEMANN, of Natrona, county of Allegheny, State of Pennsylvania, have invented a new and useful Process for Manufacturing Soda and Alumina; and I do hereby declare the following to be a full, clear, and exact description of the same.

My invention consists in manufacturing soda and alumina of cryolite, and, by the agency of bauxite, I gain a larger quantity of alumina, without losing any soda.

To enable others skilled in the art to make and use my invention, I will proceed to describe its mode of operation.

Fine pulverized cryolite is mixed with pulverized carbonate of lime, or hydrate of lime, and pulverized bauxite; the proportions of this mixture varying, according to the purity of the materials, so that on each part of pure cryolite will come about six (6) parts of pure lime and bauxite, in such proportion that the quantity of alumina contained in the bauxite will be equal to the quantity of alumina in the cryolite.

Through a series of experiments, I have found that a mixture of twenty parts pure cryolite, twenty-five parts of well-slaked lime, (slaked to a dry powder,) and ten parts of bauxite, containing about forty-four per cent. of alumina, is a well-proportioned mixture.

The substances of which the above-described mixture consists, are carefully mixed, and then calcined at a red heat in a furnace. At such heat, the cryolite will be decomposed by the lime, and form aluminate of soda, soda, and fluoride of calcium, but the soda, which is not combined with the alumina contained in the cryolite, will combine with the alumina contained in the bauxite, thus giving aluminate of soda, and fluoride of calcium, as the final products of decomposition.

By liquidation with water, the aluminate of soda is dissolved and separated from fluoride of calcium, and impurities which have been brought into the mixture by cryolite and bauxite.

The solution of aluminate of soda is treated with carbonic acid, which combines with the soda, and becomes carbonate of soda, while alumina, as hydrate of alumina, is precipitated.

By settling and filtration, the separation of the hydrate of alumina from the carbonate-of-soda solution is effected. When cryolite is decomposed by carbonate or hydrate of lime, without admixture of bauxite, only half of the soda contained in the cryolite will find alumina enough to form alumina of soda, but when bauxite is present, the other half of the soda will combine with the alumina contained in the bauxite, thus extracting from this material (bauxite) just as much alumina as is contained in the cryolite, consequently increasing the yield of alumina one hundred per cent. While thus a mixture of twenty parts pure cryolite, with twenty-five parts slaked lime, yields seventy-two and one-half per cent. carbonate of soda, and twenty-two and one-half per cent. alumina, the above-named mixture will yield seventy-two and one-half per cent. carbonate of soda, and forty-three and one-half per cent. alumina.

Having thus described my invention,

What I claim, and desire to secure by Letters Patent, is—

The manufacture of soda and alumina, by the decomposition of cryolite with carbonate or hydrate of lime, and bauxite, or any other material containing alumina in a free state, substantially as described.

In testimony whereof, I have signed my name to this specification, in the presence of two subscribing witnesses.

GUSTAV A. HAGEMANN.

Witnesses:
JOHN JÜHLER,
T. ARMSTRONG.